Patented Apr. 1, 1952

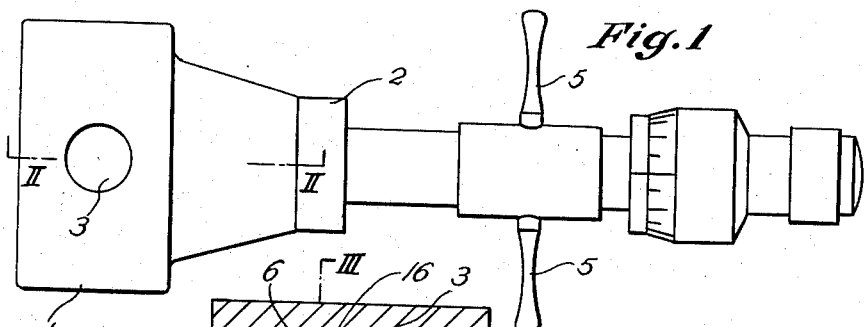
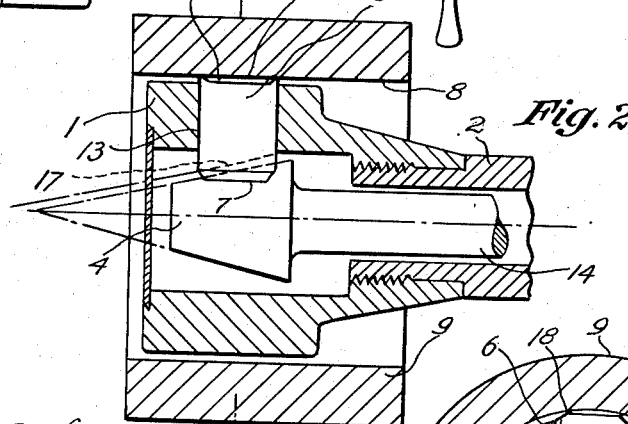
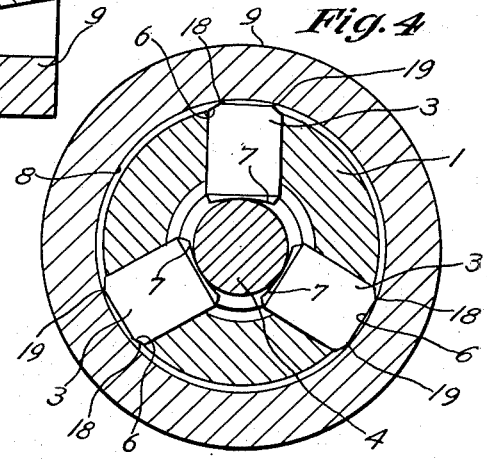
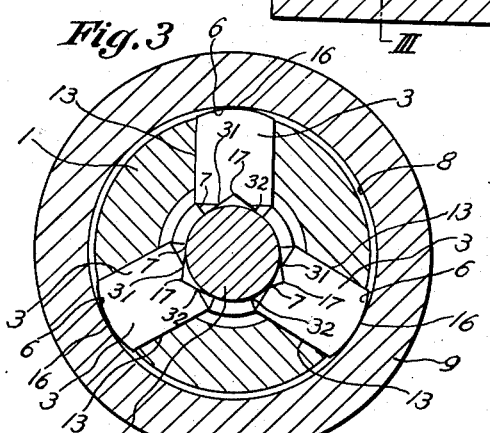
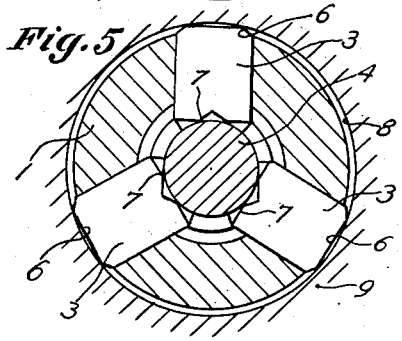
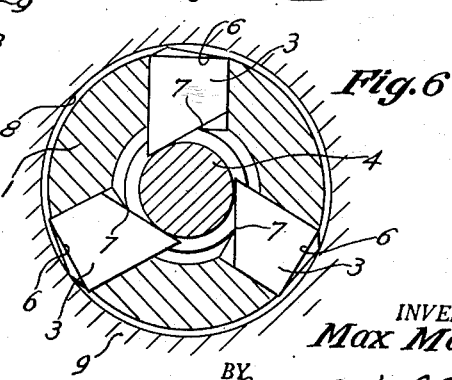

2,591,452

UNITED STATES PATENT OFFICE 2,591,452

INTERNAL DIMENSION GAUGE

Max Maag, Zurich, Switzerland

Application November 21, 1945, Serial No. 629,930
In Switzerland November 13, 1944

Section 1, Public Law 690, August 8, 1946
Patent expires November 13, 1964

5 Claims. (Cl. 33—178)

The present invention relates to dimension gauges and measuring instruments and more particularly to internal adjustable gauges adapted to measure the diameters of bores in workpieces. Gauges of the type aforesaid are known in which a conical member is axially displaced within a gauge head and thereby moves radially disposed gauging pins against the wall of the bore of which the exact diameter is to be ascertained. The axial displacement of the said conical member is directly proportional to the radial displacement of the gauging pins and therefor also proportional to the diameter of the bore being measured.

The main object of the present invention consists in the provision of means to increase the accuracy of gauges of the type aforesaid and to lessen the time necessary to take the said exact measurements.

The said object is attained according to the present invention by providing a special shape on the outer end faces of the radially displaceable pins contacting the wall of the bore and on the inner ends which contact the conical axially displaceable member.

In the gauges described in the U. S. Patents 2,329,067 and 2,316,877 granted me September 7, 1943 and April 20, 1943, respectively, the face of each pin, contacting with the conical member is conical and contacts with the member along a straight line in a plane passing through the axis of the said member as well as of the pin. The face at the outer end of the pin is cylindrical and the radius of the said face corresponds to the radius of the smallest bore to be measured by the gauge. The outer face of the pin contacts with the wall of any other larger bore by a line.

If the plane through the axis of the pin and the two contacting lines on the inner and the outer face of the pin is at an angle to the axis of the conical member, the said pin will be turned about its axis by introducing the gauge into the bore to be measured. The shortest distance between the outer face of the pin and the axis of the member is only attained when the above said plane through the contacting lines of the faces of the pin coincides with the axis through the conical member.

By introducing the gauge into a bore each pin, which is circular in cross section and free to turn, will receive a certain torque as soon as the pin is out of its proper position. The torque decreases more and more until the pin reaches its correct position in which position the torque equals 0. The gauge however is introduced into the bore to be measured by hand and usually not exactly along the axis of the conical member. The friction exerted by the two faces of each pin on the wall of the bore and on the conical surface of the said member acts against the turning of the pin about its axis. The friction depends on the strength of a spring acting along the axis of the conical member. The said friction counteracts the force tending to turn the pin and to bring the same into its true position. It has been customary to vibrate the gauge by hand to induce the pins to assume their true position. This expedient does not work satisfactorily as the aligning force decreases rapidly when the pins approach their true position in which the line of contact falls into the plane passing through the axis of the conical member. The time of vibrating or agitating the gauge and the work connected therewith might be saved wholly or in part if the torque to rectify the position of the pins could be increased as the pins are about to reach their true end position.

According to the present invention there are three different ways to attain the desired object:

1. If the inner end of the pin is not provided with a conical face in conformity to the conical surface of the axially displaceable member but with a groove of V-shaped cross-section and contacting with said member with two planes intersecting each other in a line of a plane in which the axis of the conical member lies, then the pin contacts with the conical surface of the axially displaceable member by two straight lines converging towards the top of said conical surface and intersecting each other in the axis thereof. The said conical member will exert a turning moment on the pin when being forced inwardly. The force tending to turn the pin will depend on the angle between the walls of the groove sunk into the face of the pin and on the forces exerted by the conical member in the direction of its axis.

2. A similar effect may be attained if the outer face of the pin is shaped in such a manner that the outer end of the pin contacts the wall of the bore not along one but along two parallel contacting lines. Two contacting lines may be formed for instance by flattening the cylindrical outer face of the pin along the center line of the face in such a manner that two parallel contacting edges on said face are produced. The torque tending to adjust the pin increases with the distance between said two parallel edges. It is however to be considered that the increase of the distance between the edges is limited if the pin has a circular cross-section, as the length of the edges decreases with the increase of the distance between them for a pin of given diameter. The length of the edges has to be kept within certain limits to get the best effect; said distance might be calculated.

3. The above described modes of shaping the ends of the pins might be combined and the two ends of one and the same pin may be shaped accordingly. The inner end of a pin might be provided with a V-shaped groove and the outer face with two parallel edges apart from each other. The pin therefore would rest with two lines on its inner face on the outer surface of the axially displaceable conical member and would touch at its outer face the wall of the bore to be measured by two contacting lines. The effects of the above said means at the opposite ends of the pin would about double the turning moment on the pin.

A strong turning effect on the pin to rectify its position might be attained by bevelling the two ends of the pin. By the bevelling of the pin at each end the pressure of the pin against the wall of the bore 13 in which it moves and therefore the friction would increase proportionally and the said friction would be opposed to the torque tending to rectify the position of the pin. The result would not be quite satisfactory.

In the annexed drawing several embodiments of my invention are shown by way of examples.

Fig. 1 shows a gauge in side elevation illustrating the type of gauges to which the present invention may be applied.

Fig. 2 shows the head of the gauge in central axial section on a large scale on line II—II of Fig. 1.

Fig. 3 is a cross-section taken on line III—III of Fig. 2.

Figs. 4 to 6 each illustrate in a cross-section through the head of a gauge a separate embodiment of my invention.

The head 1 of the gauge shown in Figs. 1 to 3 is screwed on a sleeve 2, in which the shaft 14 is axially displaceable as shown and described for instance in the U. S. Patents 2,316,877 and 2,329,067 referred to above. The head 1 is provided with three radial bores 13 disposed at equal angular distances apart. In each bore 13 a pin 3 is slidably arranged. The axes of the three pins 3 are in a common plane at a right angle to the axis of the shaft 14. The latter is provided with a conical member 4 adapted to displace the pins 3 in radial directions by moving the shaft 14 in axial direction by a handle 5. The pins 3 rest on the conical member 4 with their faces at their inner ends. The outer faces 6 of the pins 3 are parts of a cylindrical wall having a radius of curvature equal to that of the smallest bore to be measured by the gauge. The inner face 7 of each pin 3 is provided with a V-shaped groove 17. The pin 3 rests on the conical member 4 along two lines 31, 32 Fig. 3 converging towards the point of the conical surface of member 4.

The outer face 6 of each pin 3 is cylindrical and contacts with the inner wall 8 of the bore in ring 9 to be measured by a line 16. By pressing the contact member 4 against the pins 3 for instance by a spring the said member 4 passes along the grooves 17 of the pins 3. If the line of contact 16 is not parallel to the axis of the member 4 each pin 3 will be turned about its axis. The pin 3 contacts at its inner end with the conical member 4 along two lines 31, 32 and on the inner wall 8 of the ring 9 along one line 16. The torque tending to turn the pin 3 to bring the line 16 parallel to the axis of the conical member 4 increases as described above.

In the construction of the gauge shown in Fig. 4 the inner face of each pin 3 is conical conforming to the outside surface of the member 4 at its base. The outer face of each pin 3 is flattened at its centre in such a manner that two straight edges 18, 19 are produced running parallel to each other each adapted to touch the wall 8 of the bore of the body 9. The pin 3 contacts with the member 4 along one line and on the wall 8 along two lines. The torque created by introducing the gauge into the bore to be measured creates a turning moment on the pin 3 as described above under 2.

Fig. 5 shows an embodiment of my invention in which the inner face 7 of each pin 3 conforms to the construction shown in Fig. 3 and the outer face to the construction shown in Fig. 4. The torque created is the maximum one as described above under 3.

In Fig. 6 a construction is shown in which the two faces 6 and 7 are bevelled. The drawbacks of this construction are described above. Each pin 3 touches the member 4 and the wall 8 by but one line. By pressing the pins 3 on to the wall 8 by the member 4 friction is created between the pins 3 and the radial bores in which they are moving reducing the torque tending to bring the pins 3 into their correct position.

What I wish to secure by Letters Patent is:

1. An internal adjustable bore gauge comprising in combination, a casing having an opening therethrough, a slidable member within the casing having a forward conical end, pins of circular cross-section radially disposed and movable rotatably in said casing, said pins being adapted to engage the bore being gauged at their outer ends and to engage the conical end of said slidable member at their inner ends, and means on the opposite end surfaces of the pins to effect a turning movement of said pins about their axes when inserting same into the bore to be gauged, one of said end surfaces being provided with a V shaped groove.

2. An internal adjustable bore gauge comprising in combination, a casing having an opening therethrough, a slidable member within the casing having a forward conical end and pins of circular cross-section radially disposed and movable, rotatably in said casing, said pins adapted to engage the bore being gauged at their outer ends and to engage the conical end of said slidable member at their inner ends, said inner ends being provided each with a V-shaped groove the two faces of which contact said conical member along two lines, the line of intersection of the two faces passing through a point in the axis of the conical member.

3. An internal adjustable bore gauge comprising in combination, a casing having an opening therethrough, a slidable member within the casing having a forward conical end and pins of circular cross-section radially disposed and movable, rotatably in said casing, said pins adapted to engage the bore being gauged at their outer ends and to engage the conical end of said slidable member at their inner ends, the faces of the outer ends of said pins being provided with two edges running parallel to each other and adapted to contact the wall of a bore to be measured.

4. An internal adjustable bore gauge comprising in combination, a casing having an opening therethrough, a slidable member within the casing having a forward conical end, pins of circular cross-section radially disposed and movable in said casing, said pins being adapted to engage the bore being gauged at their outer ends and to engage the conical end of said slidable member at their inner ends, said pins having straight edges on their opposite ends disposed laterally of the pin axes so that said edges will engage the bore being gauged and said slidable member along said parallel laterally disposed edges, whereby said pins will be turned on their axes into gauging position when inserting same into the bore being gauged.

5. An internal adjustable bore gauge comprising in combination, a casing having an opening therethrough, a slidable member within the casing having a forward conical end, pins of circular cross-section radially disposed and movable in said casing, said pins being adapted to engage the bore being gauged at their outer ends and to engage the conical end of said slidable member at their inner ends, said pins at one of their end surfaces having a wedge shaped projection the apex of which is a straight line disposed laterally of the axis of its pin, whereby said pins will be turned on their axes into gauging position when inserting same into the bore being gauged.

MAX MAAG.

REFERENCES CITED

The following references are of record in the file of this patent:

UNITED STATES PATENTS

| Number | Name | Date |
|---|---|---|
| 1,252,634 | Walker | Jan. 8, 1918 |
| 1,329,456 | Carpenter | Feb. 3, 1920 |
| 2,048,407 | Price | July 21, 1936 |
| 2,135,912 | Rae | Nov. 8, 1938 |
| 2,287,097 | Graham | June 23, 1942 |
| 2,316,877 | Maag | Apr. 20, 1943 |
| 2,329,067 | Maag | Sept. 7, 1943 |

FOREIGN PATENTS

| Number | Country | Date |
|---|---|---|
| 85,267 | Sweden | Jan. 14, 1936 |
| 264,642 | Switzerland | Oct. 31, 1949 |
| 602,644 | Great Britain | May 31, 1948 |